Nov. 3, 1942. W. VAN B. ROBERTS 2,300,524

OSCILLATOR

Filed Feb. 6, 1940

INVENTOR
WALTER VAN B. ROBERTS
BY
ATTORNEY

Patented Nov. 3, 1942

2,300,524

UNITED STATES PATENT OFFICE 2,300,524

OSCILLATOR

Walter van B. Roberts, Princeton, N. J., assignor to Radio Corporation of America, a corporation of Delaware Application February 6, 1940, Serial No. 317,488

1 Claim. (Cl. 250—27)

This invention relates to oscillators for generating electrical waves, and is especially directed to oscillators making use of negative trans-conductance of thermionic tubes, and more specifically to those thermionic oscillators for producing sawtooth and square wave forms. Such oscillators are extremely useful with cathode ray oscillographs for producing deflections both magnetically and electrostatically.

A sawtooth wave form of current through an inductance coil has been obtained in the past by the use of known circuits for obtaining a sawtooth wave of voltage and impressing this wave upon the grid of an amplifier in whose output circuit the deflection coil is connected. A drawback to this arrangement, in addition to the multiplicity of circuit elements required, is that a current flowing in a large inductance in a plate circuit of a tube cannot readily be stopped in a short time by the application of a predetermined negative potential on the grid. This results because the electro-kinetic energy in the coil creates an extremely high positive potential on the plate of the tube during rapid decrease of current, thereby tending to offset the negative potential on the grid and to maintain the current through the tube.

In accordance with the present invention, not only is the circuit arrangement simplified, but the effectiveness of the voltage tending to stop the current flowing through the coil is maintained at all times greater than the effectiveness of any voltage developed in the direction tending to maintain the current. This result is obtained by connecting the deflection coil in the output circuit of a negative trans-conductance device and by feeding back from the output circuit to the input circuit of the device a voltage in the same phase as the voltage developed across the coil. So long as the voltage thus fed back has a greater influence on stopping the current through the coil than the voltage developed on the output electrode of the device has with respect to maintaining the current, the internal current in the device shuts itself off substantially instantly once the current through the coil commences to decrease in magnitude.

It may thus be stated that the object of the present invention is to provide a generator of current having a sawtooth wave form through an inductance coil characterized by cophasal feedback from the output circuit of a negative trans-conductance device, the output circuit of which includes an inductance, to the input circuit of the device.

Another object of the present invention is to provide a generator from which there may be derived potentials having a rectangular wave form.

Other important objects and features of the invention will become clear upon a reading of the following specification when taken together with the drawing, in which Fig. 1 shows an embodiment of the invention utilizing a secondary emission electron discharge device as a negative trans-conductance;

Figure 1:
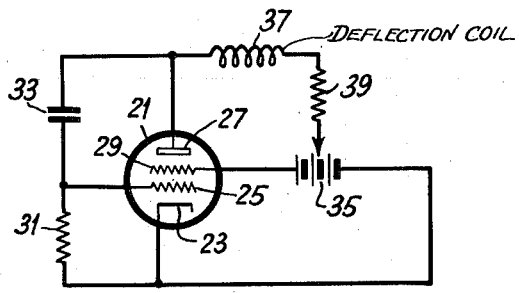

Referring now to Figure 1, a screen grid tube 21 has its screen 29 maintained at a suitably high positive potential by means of a battery or other source 35. In the plate circuit of the tube there is connected an inductance 37, which serves as a deflection coil for a cathode-ray oscilloscope, and a source of voltage somewhat less than that applied to the screen. For the purpose of observation, a resistance 39 of small value may be connected in series with coil 37 to provide a voltage drop proportional to current through 37 and sufficient in magnitude to actuate an oscilloscope. A condenser 33 is connected between output electrode 27 and input electrode 25 of the device to provide feedback while a grid resistance 31 is connected between grid 25 and cathode 23. The voltages applied to the screen 29 and output electrode 27 are chosen to produce a reversed current through 37 as disclosed in my U. S. Patent 2,093,781. Under these conditions, the device 21 exhibits negative trans-conductance between its input electrode 25 and its output electrode 27. Therefore, so long as current through 37 is increasing in magnitude the voltage feedback through 33 to 25 tends to favor further increase of the current through 37. However, the rate of increase of current through 37 is limited by the voltage supply 35 so that the growth of current is gradual and approximately linear. When, however, the current ceases to grow, a negative potential is fed back to 25 which tends to further reduce the current in 37. This action is cumulative and takes place substantially instantly with respect to the current flowing inside of the tube so that the kinetic energy resident in 37 must be dissipated in resistance 31 or in the form of a spark or converted into potential energy in the various circuit capacities associated with 37. It is believed that residual wiring inductances may be responsible for causing the current to start decreasing after a certain period of growth but I do not wish to commit myself to a theory of operation of the arrangement with respect to this point. I have determined, by oscillographic observation, that a substantially sawtooth wave form of current may be obtained with the following circuit constants:

Tube 21 may be a standard type 124 screen grid amplifier,
Capacitor 33 may be two microfarads,
Resistor 31 may be 5 megohms,
Inductor 37 may be a General Radio Co. type 369 inductance of approximately 100 henries,
Resistor 39 may be 4000 ohms,
The voltage applied to electrode 29 of tube 21 may be 110 volts, and
The voltage on anode 27 of tube 21 may be of the order of 80 volts.

Figure 3:
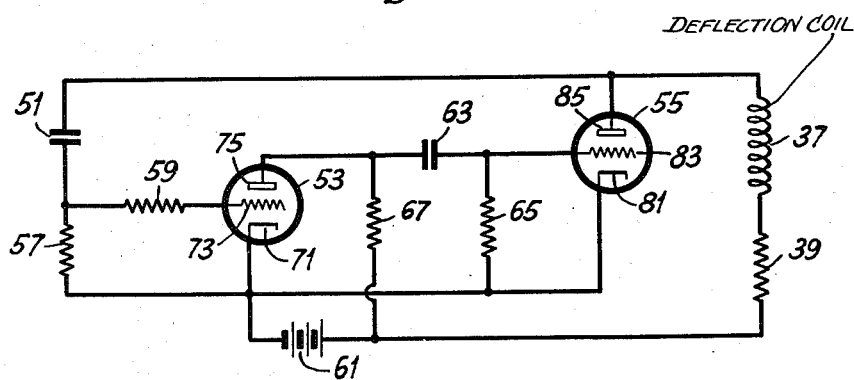
Fig. 3 is a modified arrangement of the invention employing a phase reversing tube to produce negative trans-conductance between the input electrode of one tube and the output circuit of the following tube.
Figure 2:
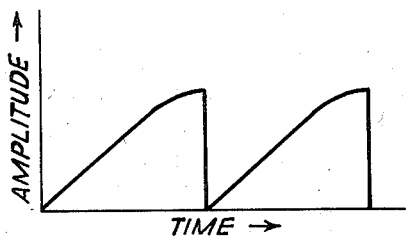
Fig. 2 shows drawn to scale the output current wave of the arrangement of Fig. 1 as photographed from an oscilloscope.

Figure 3 shows a modification of the invention employing two ordinary triode tubes 53 and 55, the first of which is arranged as a phase reversing tube so that a pulse of positive potential on the plate 85 of the second tube produces a pulse of negative potential on the grid 83 of the second tube to which is connected the deflection coil 37. So long as the ratio of these two pulses in the order named does not equal or exceed the amplification constant of the second tube 55, any diminution in the plate current of the second tube 55 results in a further shutting off of the plate current which, as explained before, is a cumulative process which goes on to completion in a negligible time.

Figure 4:
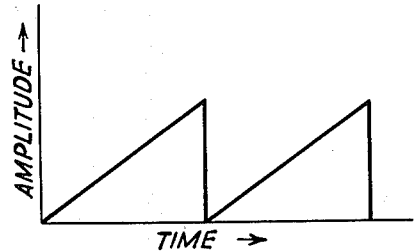
Fig. 4 is a drawing representing qualitatively, the oscilloscopic record of the output current of Fig. 3.

Figure 4 is a drawing taken from an oscilloscope connected to the arrangement of Fig. 3 with the following constants:

The tubes 53, 55=Radiotron type 56 triode
Resistors 57, 59=one megohm
Capacitor 51=.006 microfarad
Capacitor 63=$\frac{1}{10}$ microfarad
Resistor 67=$\frac{1}{10}$ megohm
Resistor 65=¼ megohm
Resistor 39=3500 ohms
Battery 61=115 volts It will be understood that sawtooth wave forms may be obtained in accordance with the invention using widely different circuit components and constants than those mentioned by way of example, and it is also evident that compensation networks including non-linear elements may be added to the circuits in known manner to modify the wave form to meet particular requirements.

It will be appreciated, of course, that the resistance 39 in both Figures 1 and 3 is connected in series with the inductance 37 for the purpose of obtaining a sawtooth wave for purposes of observation or for feeding to any high impedance source where it is desirable to have such a sawtooth wave.

It will also be appreciated that where it is desired to have a square top wave, i. e., one of rectangular wave shape for supplying to a high impedance circuit, such a wave can be derived by connections across the inductance 37. This follows from the fact, as is well known, that the voltage wave across an inductance through which there is flowing a sawtooth current wave, has substantially a rectangular wave shape.

Having described my invention, what I claim is:

An oscillator comprising a first thermionic amplifier having at least a cathode, control grid, and an anode, a resistance-capacity output circuit connected to said anode, a second thermionic amplifier having at least a plate, control electrode, and a cathode, and an input circuit, said input circuit being connected to said output circuit of said first thermionic amplifier, an output circuit connected to the plate of said second thermionic amplifier, said output circuit comprising a deflection coil for a cathode-ray oscilloscope in series with a resistor, a pair of serially connected resistors connected between the cathode and control grid of said first thermionic amplifier, and a condenser connected between said plate and the junction point of said pair of resistors.

WALTER van B. ROBERTS.